United States Patent [19]

Mikulich et al.

[11] 4,353,676
[45] Oct. 12, 1982

[54] BUNKER FOR TUNNEL BORING

[75] Inventors: Henry V. Mikulich; Richard P. Lehmann, both of Kingsford, Mich.

[73] Assignee: Lake Shore, Inc., Iron Mountain, Mich.

[21] Appl. No.: 170,650

[22] Filed: Jul. 21, 1980

[51] Int. Cl.³ .............................................. B60P 1/00
[52] U.S. Cl. .................................. 414/512; 405/268; 414/510
[58] Field of Search ................................ 414/509–512, 414/516, 519, 325, 304, 300, 398, 373, 572; 37/104, 105; 405/138, 179, 268; 404/91, 110; 299/43, 56, 18, 57, 64; 298/23 MD; 198/560; 172/479, 767

[56] References Cited

U.S. PATENT DOCUMENTS

| | | | |
|---|---|---|---|
| 1,451,106 | 4/1923 | Palmer et al. | 414/328 |
| 1,961,193 | 6/1934 | Brumbaugh | 298/23 MD X |
| 2,297,294 | 9/1942 | Flintjer | 172/479 X |
| 3,273,728 | 9/1966 | Kelso | 414/509 X |
| 3,664,137 | 5/1972 | Lett | 405/179 X |
| 4,111,485 | 9/1978 | Martin et al. | 414/510 X |

Primary Examiner—John J. Love
Assistant Examiner—L. E. Williams
Attorney, Agent, or Firm—Bayard H. Michael

[57] ABSTRACT

The open topped telescoping bunker body is filled from above and material in the body can be discharged when the tail gate at the rear is opened. A double acting push plate is used to push material through the open tail gate and material falling into the body ahead of the push plate during discharge can be ejected through the open front end of the body ahead of the plow blade. The plow blade levels the material to form a roadway as the skid mounted bunker is pulled forward. The blade can be raised to allow passage of men or material under the body. The push blade moves with and with respect to the moving part of the telescoping body.

15 Claims, 6 Drawing Figures

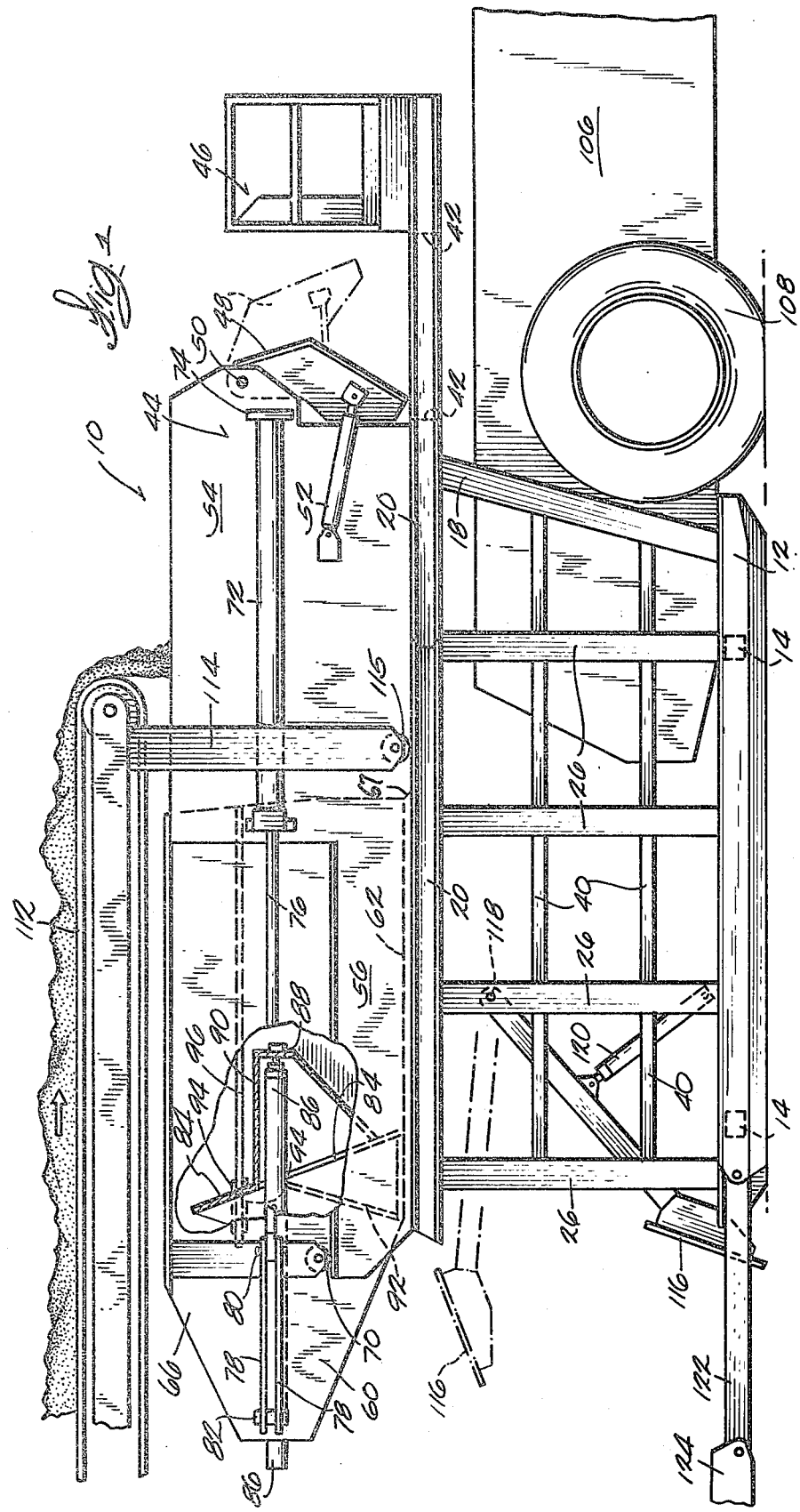

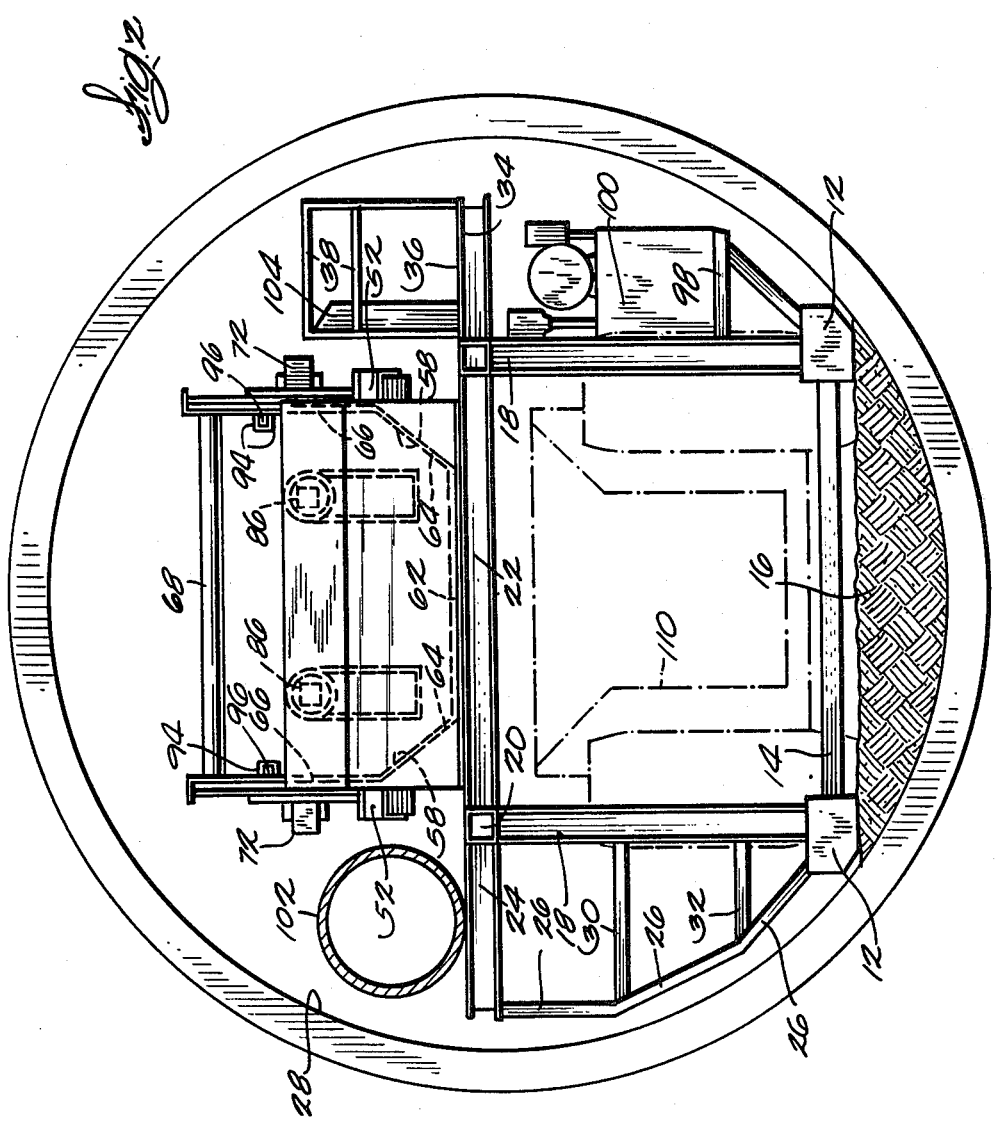

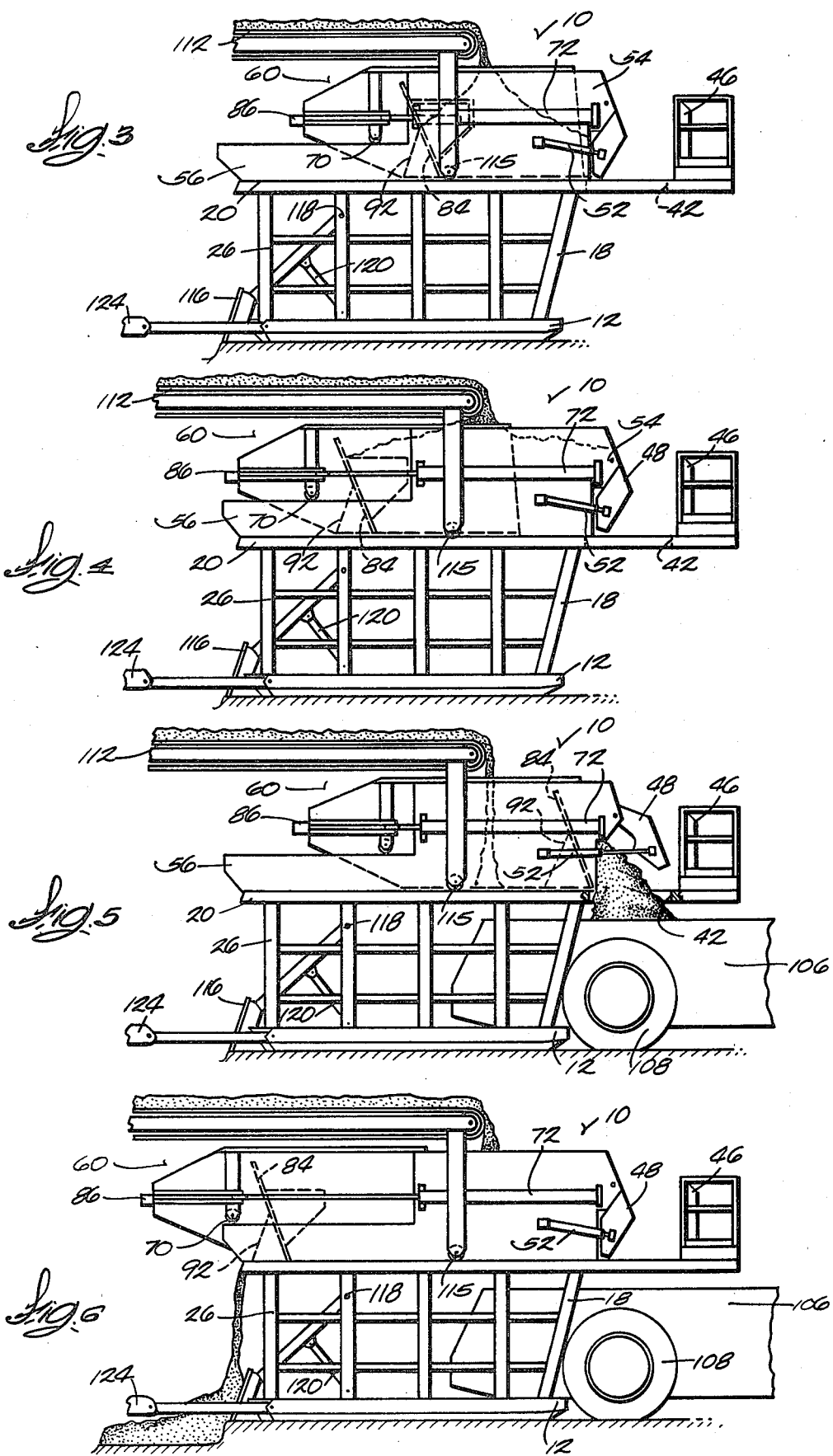

BUNKER FOR TUNNEL BORING

FIELD OF THE INVENTION

In tunneling and certain mining operations a boring machine is used at the tunnel face (end) to cut into the material. Since there is not a lot of room for maneuvering vehicles in the tunnel the removal of the debris or muck is limited by the transit time (distance) to the portal. It is also necessary to build a roadway for the vehicles operating in the tunnel. This usually results in the boring machine operating less than full time. It is obviously desirable to operate the boring machine full time to minimize handling of the debris, i.e. avoid dumping the debris from the boring machine on the tunnel floor and then requiring that it be picked up to load the vehicle. Nothing has been provided to achieve these goals.

SUMMARY OF THE INVENTION

The purpose of this invention is to provide a storage bunker of variable capacity to receive the discharge from a boring machine (via a transfer conveyor) and to load a mine vehicle rapidly. Additionally, the bunker can discharge some of the load ahead of the bunker frame where it is smoothed by a plow carried by the frame to make a roadway over which the frame is pulled by the boring machine.

The bunker body is telescopic and has a push plate which is used to crowd the incoming material towards the discharge end of the body. When the transport vehicle is positioned below the discharge end the tail gate is opened and the push plate is actuated to push material out of the discharge end into the vehicle. When the push plate is at the rear of the body material delivered by the transfer conveyor falls in front of the push plate and the push plate and body may be run forward to eject that material ahead of the plow to be leveled into a roadway over which the bunker is pulled and the transport vehicle travels. The supporting framework has an open passage thereunder and the plow can be raised to permit passage of personnel and equipment under the bunker.

With this bunker the boring machine can operate continuously and the tunnel progess is maximized. No similar equipment has been used before.

BRIEF DESCRIPTION OF THE DRAWINGS

FIG. 1 is a simplified side elevation showing the body fully extended.

FIG. 2 is an elevation from the right in FIG. 1 showing (in dotted lines) the interior configuration of the body and of the vehicle.

FIG. 3 shows the body fully compressed and receiving material from the transfer conveyor.

FIG. 4 shows the body partly extended.

FIG. 5 shows the completion of the discharge with the body shortened and the push plate moved to the rear to push material out of the open tail gate while incoming material falls forward of the push plate.

FIG. 6 shows the body fully extended and the push plate at its most forward position, ejecting material ahead of the plow.

DESCRIPTION OF THE PREFERRED EMBODIMENT

The bunker 10 is mounted on top of a framework which is fixed to the two parallel skids 12. The skids are interconnected by cross members 14 near each end at a height slightly above the surface roadway 16 on which the skids rest. Each side of the framework has a multiplicity of upright columns 18 which support the longitudinal beams 20 to which transverse beams 22 are secured to span the interior tunnel-like space of the framework. As seen in FIG. 2, the left side of the framework is provided with laterally extending beams 24. The outboard ends of these beams are provided with formed support members 26 shaped to fit inside the wall 28 of the tunnel. Cross members 30, 32 are provided to give a skelton-type support for material storage or cables running forward to the boring machine at the base of the tunnel. The right side of the framework is provided with laterally extending beams 34 which support a walkway 36 and guard rail 38. The outboard uprights 26 are interconnected by horizontal braces 40 and the inner upright columns 18 are interconnected by diagonal braces which have been omitted for clarity of the relevant portion of this disclosure. A floor plate is provided on the top of the central section of the framework for the entire length of the upper frame with the exception of the cutout portion 42 between the rear of the fixed body 44 and the operator station 46. The fixed body portion 44 is provided with a tail gate 48 hinged at 50 and actuated by the hydraulic ram 52 between a closed position, shown in solid lines in FIG. 1, and an open position shown in dotted lines. The side walls 54 of the fixed body have forwardly extending lower sides 56. As can be seen in FIG. 2 the inside of the side walls 54 include diagonal sloping wall portions 58 giving the body a generally U-shaped interior confining the contents to the central portion of the body.

A moving or telescoping body 60 is mounted inside the stationary body 44. This body has its own floor 62, sloping side walls 64 and vertical side walls 66 which are designed to fit inside of the stationary body 44. The rearward end of the moving body has a sloping or scraper edge 67 designed to slide under the debris in the body. The upper portions of the side walls 66 of the moving body are braced by cross members 68 and the forward portion of the moving body is provided with a roller or flanged wheel 70 riding on the upper edge of the forwardly projecting stationary side wall portions 56 to support and guide the moving body. The moving body is thus supported at the front end by the wheels and the rear end rests on the floor plate.

Movement of the moving body portion relative to the stationary body portions is controlled by the hydraulic ram 72. The rear portion of the ram is connected to and bears against plate 74 on the side of the stationary body ram adjacent the forward end of the stationary body. The ram piston rod 76 extends forwardly and is connected to push rods 78, 78 by a clevix pin 80. The rods 78 bear against a cross beam 82 in the forward end of the moving body. When the cylinder on each side of the bunker is energized, the telescoping body portion is moved to the extended (forward) position shown in FIGS. 1 and 6 or can be moved to its telescoped (rearward) position such as shown in FIGS. 3 and 5. Since the pressure in the two rams can be easily equalized the body does not cant and jam.

A push plate 84 is mounted inside the moving body portion for movement under control of two hydraulic rams 86. The forward end of the hydraulic ram cylinder projects to the left in FIG. 1 and is secured to the cross beam 82 as well. The ram passes through the push plate 84 and the piston rod bears against the end plate 88 of shroud 90 which encloses the cylinder and piston rod to prevent damage or fouling. Two of these cylinders are actuated in unison under equalized pressure to move the push plate 84 from its most forward position relative to a moving body as shown in FIG. 1 or to its most rearward position relative to the moving body as shown in FIG. 5. It will be noted the push plate includes a forwardly facing sloping push wall 92 which can be utilized to push material located to the left of plate 92 to eject that material over the end of the telescoping body when the telescoping body has been fully extended as shown in FIGS. 1 and 6. The upper portion of each side of the push plate is provided with wear bars 94, 94 positioned above and below the guide bar 96 fixed on the inside wall of the moving body to guide the push plate as it moves along the length of the moving body portion. As can be seen in FIG. 2 a push plate has a shape corresponding to the interior shape of the moving body portion and is preferably provided with wear plates at those portions of the push plate which contact the interior of the body. The guide 96 prevents any tendency of the push plate to "trip" or pivot about the corner of plate 84 or 92 during movement.

On the right side (FIG. 2) the frame is provided with a support bracket 98 supporting a hydraulic power unit 100 below the catwalk within the confines of the tunnel. The space above the projecting beam 24 on the left can conveniently support a ventilation pipe 102 extending forwardly to the tunnel face. The principal operator console 46 is at the rearward position of the bunker while the side catwalk leads forward to an additional control station 104 near the forward end of the bunker.

As can be seen in FIGS. 1, 2 and 5, a transport vehicle 106 can be backed under the bunker until the tires 108 contact the inclined beam 26 to position the truck under the discharge end. The typical truck of this type has an interior such as shown in dotted lines 110 in FIG. 2 and it will be seen that the sloping inner walls of the bunker will discharge into this shape efficiently. Typically, this vehicle is one such as manufactured by Wagner Mining Equipment Company and it has a telescopic body which facilitates filling the vehicle while parked under a stationary discharge point.

Debris from the boring machine at the tunnel face is transferred to the bunker via a transit conveyor 112 which is supported by the upright support columns 114 having wheels 115 rolling on the floor plate to permit relative movement between the bunker and the conveyor. The discharge end, of course, is positioned to discharge into the stationary body when the telescoping body has been moved to its most rearward position such as shown in FIG. 3 with the push plate forward. As the material is discharged into the body, the moving push plate can be actuated to move rearwardly to crowd the debris towards the rear end of the bunker. As the stationary body fills up the telescoping body can be moved forwardly which will, of course, take the push plate with it. Thus, the body can be extended more and more to fill the bunker while awaiting arrival of the vehicle to be loaded. In FIG. 4, the moving body is shown partly extended towards the front and, of course, if fully extended to the front the entire bunker could be filled. When the vehicle arrives the ram 52 is actuated to open the tail gate and dump the contents into the vehicle. At this time the moving body is started forward to cause the push plate to start pushing the debris out of the discharge end. When the telescoping body has reached its most rearward position (telescoped position) the ram 86 can be actuated to continue movement of the push plate until it reaches its most rearward position as shown in FIG. 5. Thus, the contents can be discharged completely although the bunker is designed with a somewhat greater capacity than the truck can hold, thus having the potential for greater storage should the vehicle take unduly long in making its round trip to the portal. It will be appreciated that with a vehicle of this size only one can operate in the tunnel at one time since there is no room for such vehicles to pass one another in the tunnel. Typically the vehicles hold 25 tons while the bunker can hold 35 tons.

It will be noted in FIG. 5 that when the push plate has been moved to the rearward position any debris discharged by the transfer conveyor will fall on the forward side of push plate 92. This material can be discharged ahead of the bunker as shown in FIG. 6 where it falls ahead of the plow 116 pivotally mounted at 118 to the bunker frame and actuated by hydraulic ram 120 between the operating position shown in solid lines in FIG. 1 and the elevated position shown in dotted lines in FIG. 1. When the debris is discharged ahead of the plow as shown in FIG. 6, the plow is in position to smooth out the debris and build a roadway upon which the bunker will ride. The forward end of the bunker is provided with links 122 connecting to a draw bar 124 carried directly by the boring machine or connected to the boring machine via hydraulic rams which can be actuated to advance the bunker in the tunnel independently of movement of the boring machine. In the alternative, the bunker can be tied directly to the boring machine to advance as the boring machine advances. Thus, the bunker has provision for building its own road which will, of course, serve also as a roadway for the vehicle 106. The plow can be raised to the dotted line position in FIG. 1 to allow 6½ foot clearance for passage of men or equipment to the tunnel face.

We claim:

1. A bunker for receiving material from an excavating machine and discharging the material into a vehicle or discharging the material ahead of the bunker, characterized by
    a frame moveable over the ground and providing a fore and aft passageway through the frame,
    a body mounted on the frame with a discharge opening at each end of the body,
    a gate closing the discharge opening at one end and operable to an open position to permit discharge from the body into a vehicle positioned therebelow,
    a push plate mounted in the body for movement towards said one end to push material out of the discharge opening and for movement away from said one end to allow material to accumulate in the body between the push plate and said one end,
    said push plate also being moveable towards said one end to permit accumulation of material in the body on the side of the push plate opposite the side facing said one end whereby subsequent actuation of the push plate towards the other end of the body is operative to discharge such material through the opening at the other end of the body to make a surface to support the frame.

2. A bunker according to claim 1 including:
    a plow mounted at said other end for leveling the discharged material as the frame is moved in the direction of the material.

3. A bunker according to claim 2 including:
means for raising the plow to permit movement of people and equipment through said passageway.

4. A bunker according to claim 3 in which the frame is mounted on skids and is provided with means for connecting the bunker to a tunnel boring machine.

5. A bunker according to claim 1 in which the body is telescopic and has a stationary first body and a moving second body, and including means for moving the second body relative to the first body.

6. A bunker according to claim 5 in which the push plate is mounted in the second body for movement with and with respect to the second body.

7. A bunker according to claim 6 in which the second body is generally U-shaped in cross section and is open at both ends, said push plate fitting inside the second body.

8. A bunker according to claim 7 including:
roller guide means supporting and guiding one end of the second body as it moves relative to the first body, the other end of the second body facing the end of the body having the tail gate and having a scraper edge contacting the first body.

9. A bunker according to claim 8 in which the second body and the push plate are provided with cooperating guide means guiding the movement of the push plate relative to the second body.

10. A bunker according to claim 9 in which the means for moving the second body relative to the first body comprises a hydraulic ram on each side of the telescopic body with one end of each ram connected to the first body and the other end of the ram connected to the second body.

11. A bunker according to claim 10 in which the means for moving the push plate comprises a pair of hydraulic rams acting between the second body and the push plate.

12. A bunker for receiving and storing material for subsequent discharge into a vehicle, comprising,
a framework,
a telescopic body mounted on the framework at a height permitting a vehicle to move under the body, said body having two sections,
the discharge end of said body being closed by a tail gate and provided with means to open the tail gate,
a push plate mounted in the telescopic body for movement with respect to both body sections,
and means for moving the push plate relative to the body to move material towards the discharge end,
the top of the body being open to receive material on either side of the push plate depending on the location of the push plate when the material is received,
the end of the body opposite the discharge end being open,
said push plate being moveable to eject material out of the open end of the body.

13. A bunker according to claim 12 including a plow blade carried by the framework below said open end of the body for leveling the material ejected from the open end as the framework is moved in that direction to thereby provide a surface to support the framework and vehicles.

14. A bunker according to claim 13 in which the framework has a tunnel-like interior and means are provided for raising the plow to permit passage of people and equipment.

15. A bunker according to claim 14 in which the framework is mounted on skids to enable the bunker to be pulled along a surface.

* * * * *